(12) United States Patent
Lee et al.

(10) Patent No.: US 12,346,737 B2
(45) Date of Patent: Jul. 1, 2025

(54) METHOD AND SYSTEM FOR MANAGING HYBRID SPARK CLUSTER FOR EFFICIENT SPARK JOB EXECUTION

(71) Applicant: DataStreams Corp., Seoul (KR)

(72) Inventors: Dong-Wook Lee, Seoul (KR); Gyu-Hong Choi, Seoul (KR); Gi-Beom Kil, Seoul (KR); Seung-Tae Chun, Seoul (KR)

(73) Assignee: DATASTREAMS CORP., Seoul (KR)

( * ) Notice: Subject to any disclaimer, the term of this patent is extended or adjusted under 35 U.S.C. 154(b) by 557 days.

(21) Appl. No.: 17/929,413

(22) Filed: Sep. 2, 2022

(65) Prior Publication Data
US 2024/0061718 A1   Feb. 22, 2024

(30) Foreign Application Priority Data
Aug. 9, 2022   (KR) .......................... 10-2022-0099002

(51) Int. Cl.
*G06F 9/50* (2006.01)
*G06F 9/455* (2018.01)

(52) U.S. Cl.
CPC .......... *G06F 9/505* (2013.01); *G06F 9/45541* (2013.01)

(58) Field of Classification Search
None
See application file for complete search history.

(56) References Cited

U.S. PATENT DOCUMENTS

| | | | |
|---|---|---|---|
| 11,310,113 B2 * | 4/2022 | Dorado | H04L 41/5045 |
| 2013/0346993 A1 * | 12/2013 | Chen | G06F 9/5072 |
| | | | 718/103 |
| 2021/0365290 A1 * | 11/2021 | Zhang | G06F 9/547 |

* cited by examiner

*Primary Examiner* — Eric C Wai
(74) *Attorney, Agent, or Firm* — Hoffman Warnick LLC (57) ABSTRACT

Disclosed are a method and system for managing a hybrid Spark cluster for efficient Spark job execution. A cluster management method which is performed by a cluster management system may include, in a hybrid Spark cluster environment including a bare-metal-based cluster and a Kubernetes-based cluster, selecting a cluster manager comprising the bare-metal-based cluster or the Kubernetes-based cluster before a Spark client performs a Spark driver program, and performing a Spark job by using the selected cluster manager.

4 Claims, 3 Drawing Sheets

METHOD AND SYSTEM FOR MANAGING HYBRID SPARK CLUSTER FOR EFFICIENT SPARK JOB EXECUTION

CROSS-REFERENCES TO RELATED APPLICATIONS

This application is based on and claims priority under 35 U.S.C. 119 to Korean Patent Application No. 10-2022-0099002, filed on Aug. 9, 2022 in the Korean intellectual property office, the disclosures of which are herein incorporated by reference in their entireties.

TECHNICAL FIELD

The following description relates to a technology for managing a Spark cluster.

This work was supported by the Technology development Program (53148640, RS-2022-00140586) funded by the Ministry of SMEs and Startups (MSS, Korea).

BACKGROUND OF THE DISCLOSURE

As the era of big data which cannot be processed by computing power of a machine arrives, a Hadoop system in which a Hadoop distributed file system (HDFS) and MapReduce have been combined is introduced into an enterprise environment, enabling distributed processing for big data in a cluster consisting of multiple machines. The HDFS and MapReduce are very popular in the enterprise environment by providing safe and robust distributed processing, but have exposed some limitations along with the popularity. One of the limitations is that a processing speed in repetitive processing, ad-hoc query, etc. is very slow. This is caused by a method of storing interim results in a disk whenever the interim results are output in a computation process. Such a method has an advantage in that it provides the stability of data processing, but has a problem with processing delay attributable to many disk input/outputs (I/Os). Apache Spark has improved the processing speed by a maximum of 100 times compared to Hadoop MapReduce in a way to remove multiple disk I/O by processing interim results in a memory without recording the interim results on a disk.

Apache Spark enables an operation to be performed on a distributed memory of a cluster that consists of multiple machines by analyzing a task to be processed in a directed acyclic graph (DAG) form. To this end, Apache Spark transmits the analyzed task to a cluster manager. The cluster manager processes the task by dividing the task into several machines. In the existing cluster consisting of a bare-metal server, YARN, Mesos, and Standalone Manager are used as cluster managers. However, as a computing environment is changed due to the development of a cloud native technology, a cluster manager in a container-based virtualized environment becomes necessary. Kubernetes which may be practically called a standard in the cloud native environment has been used as a cluster manager.

Kubernetes-based Spark (Spark on K8s) has advantages of a container without any change because Kubernetes-based Spark is driven based on a container. In contrast, Kubernetes-based Spark has a disadvantage in that resource efficiency is lower than that using a cluster manager in the existing bare-metal environment due to its resource consumption as server infrastructure because each container plays a role as a bare-metal server.

SUMMARY

This summary is provided to introduce a selection of concepts in a simplified form that are further described below in the Detailed Description. This summary is not intended to identify key features of the claimed subject matter, nor is it intended to be used as an aid in deciding the scope of the claimed subject matter.

Embodiments may provide a method and system capable of selecting a cluster and providing a Spark Job based on features of a Spark application in a hybrid Spark cluster consisting of a bare-metal-based cluster and a Kubernetes-based cluster.

In an embodiment, a cluster management method which is performed by a cluster management system includes, in a hybrid Spark cluster environment including a bare-metal-based cluster and a Kubernetes-based cluster, selecting a cluster manager including the bare-metal-based cluster or the Kubernetes-based cluster before a Spark client performs a Spark driver program, and performing a Spark job by using the selected cluster manager. Selecting the cluster manager may include converting, into a time feature weight, a resource feature weight, and an operation feature weight, an importance measure as importance numerical values related to a time feature, a resource feature, and an operation feature are designated by a user, calculating importance of the time feature for the bare-metal-based cluster or the Kubernetes-based cluster by multiplying a value obtained by weighted-summing an idle resource amount and a resource consumption rate by the time feature weight according to Equation 1 and Equation 2, $$V_{t,K8s} = \frac{\text{Core}_{r,K8s} \times CF + \text{Mem}_{r,K8s}}{\text{MAX}(\text{Core}_{r,K8s} \times CF + \text{Mem}_{r,K8s}, \text{Core}_{r,BM} \times CF + \text{Mem}_{r,BM})} \times \alpha_t + \frac{\text{Core}_{r,K8s} \times CF + \text{Mem}_{r,K8s}}{\text{Core}_{a,K8s} \times CF + \text{Mem}_{a,K8s}} \times (1 - \alpha_t)$$

Equation 1

$$V_{t,BM} = \frac{\text{Core}_{r,BM} \times CF + \text{Mem}_{r,BM}}{\text{MAX}(\text{Core}_{r,K8s} \times CF + \text{Mem}_{r,K8s}, \text{Core}_{r,BM} \times CF + \text{Mem}_{r,BM})} \times \alpha_t + \frac{\text{Core}_{r,BM} \times CF + \text{Mem}_{r,BM}}{\text{Core}_{a,BM} \times CF + \text{Mem}_{a,BM}} \times (1 - \alpha_t)$$

Equation 2 wherein $\text{Core}_r$ may mean the number of available CPU cores that remain in the cluster, $\text{Mem}_r$ may mean the amount of available memory that remains in the cluster, $\text{Mem}_a$ may mean the amount of memory allocated to the cluster, a calibration factor (CF) may mean a core conversion index, and $\alpha_t$ may mean an idle resource amount and a resource consumption rate weight, calculating importance of the resource feature for the bare-metal-based cluster or the Kubernetes-based cluster by multiplying a calculated value of a degree of parallel processing ($V_r$) by the resource feature weight when an identical resource is allocated to an identical job by assigning a weight to each of parallel processing in a process level and parallel processing in a thread level according to Equation 3 or Equation 4, $$V_{r,K8s} = \frac{\frac{\text{Core}_{r,K8s}}{\text{Core}_{exec,K8s} \times OF_r}}{\text{MAX}\left(\frac{\text{Core}_{r,K8s}}{\text{Core}_{exec,K8s} \times OF_r}, \frac{\text{Core}_{r,BM}}{\text{Core}_{exec,BM}}\right)} \times \alpha_r +$$

Equation 3

$$V_{r,BM} = \frac{\dfrac{Core_{r,BM}}{Core_{exec,BM}}}{MAX\left(\dfrac{Core_{r,K8s}}{Core_{exec,K8s} \times OF_r}, \dfrac{Core_{r,BM}}{Core_{exec,BM}}\right)} \times \alpha_r +$$

$$\frac{\dfrac{Core_{exec,K8s}}{Core_{task,K8s}}}{MAX\left(\dfrac{Core_{exec,K8s}}{Core_{task,K8s}}, \dfrac{Core_{exec,BM}}{Core_{task,BM}}\right)} \times (1 - \alpha_r)$$

$$\frac{\dfrac{Core_{exec,BM}}{Core_{task,BM}}}{MAX\left(\dfrac{Core_{exec,K8s}}{Core_{task,K8s}}, \dfrac{Core_{exec,BM}}{Core_{task,BM}}\right)} \times (1 - \alpha_r)$$

Equation 4 wherein $Core_{exec}$ may mean the number of CPU cores allocated to an executor, $Core_{task}$ may mean the number of CPU cores a allocated a task, $OF_r$ may mean resource overhead when a container is used, and $\alpha_r$ may mean a process/thread parallel processing weight.

calculating importance of the operation feature for the bare-metal-based cluster or the Kubernetes-based cluster by multiplying a value obtained by weighted-summing overhead according to the preparation of container-based driving and a container-based driving gain (container gain) by the operation feature weight according to Equation 5 or Equation 6, $$V_{o,K8s} = \frac{NumOfSparkApp \times OF_{K8s}}{MAX(NumOfSparkApp \times OF_{K8s}, NumOfSparkApp \times OF_{BM})} \times \alpha_o +$$

$$ContainerGain \times (1 - \alpha_o)$$

Equation 5

$$V_{o,BM} = \frac{NumOfSparkApp \times OF_{BM}}{MAX(NumOfSparkApp \times OF_{K8s}, NumOfSparkApp \times OF_{BM})} \times \alpha_o +$$

$$ContainerGain \times (1 - \alpha_o)$$

Equation 6 wherein $OF_{K8s}$ may mean overhead for Spark application container driving in K8s, $OF_{BM}$ may mean overhead for Spark application driving in the bare-metal-based cluster, a container gain may mean 1-$OF_{K8s}$ in case of K8s and 0 in case of BM, and $\alpha_o$ may mean a container operation weight.

The Spark Job may be executed by invoking a Spark API from an application or driving a driver program through a Spark-summit tool or may be executed through a command line interface (CLI) in a driver that is driven through a Spark-shell.

The time feature may be an index that represents importance of time that is consumed to complete the Spark Job, and may indicate that it is important to complete the Spark Job as soon as possible as a time feature value becomes greater. The resource feature may be an index that represents efficiency of a resource that is necessary to perform the Spark Job, and may indicate that it is important to perform the Spark Job by using a less resource as a resource feature value becomes greater. The operation feature may be an index indicative of a flexibility of an execution environment for the Spark Job, and may indicate that an independent execution environment is required as an operation feature value becomes greater.

The bare-metal-based cluster may basically use one executor or a small number of executors per cluster node, and the executor of the bare-metal-based cluster may perform resource sharing/parallel processing between task threads of different jobs. In the Kubernetes-based cluster, an executor may be executed for each job, the executor itself of the Kubernetes-based cluster may play a role as one virtual machine, and the executor of the Kubernetes-based cluster may perform resource sharing/parallel processing between task threads of an identical job.

A cluster that will perform a work load can be determined because importance of a time feature, a resource feature, and an operation feature is relatively designate.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, embodiments are described in detail with reference to the accompanying drawings.

Apache Spark that has presented a method of overcoming the limitations of Hadoop MapReduce for processing data based on a disk through a memory operation is used as a core technology for processing big data in various fields, such as ETL, streaming processing, and machine learning. Apache Spark requires a cluster consisting of multiple machines for a distributed operation, and uses YARN or Mesos as a cluster manager or its own cluster manager in order to request a distributed operation from the cluster. As the computing environment is changed based on a cloud, the cloud native technology, such as Kubernetes, practically plays a role as a standard. Accordingly, Apache Spark has also started to support Kubernetes from Apache Spark 2.1. Kubernetes has been officially used as a cluster manager from 3.1 version from the end of 2020. A method of using a cluster manager in the existing bare-metal environment and a method of using Kubernetes as a cluster manager in a virtualized container environment have a difference in a method of driving a Spark Job, and thus have a difference in execution efficiency of the Spark Job. In an embodiment, in a hybrid Spark cluster consisting of a bare-metal-based cluster and a Kubernetes-based cluster, an operation of selecting a cluster and performing a Spark Job based on features of a Spark application is described.

A cloud management system may perform a decision of a Spark cluster based on a pre-decision, that is, before a Spark driver program is performed in a Spark client and a workload-based decision, that is, timing at which a driver program is performed and features of Spark Jobs are confirmed. In an embodiment, an operation of deciding a Spark cluster before a Spark driver program is performed in a Spark client is more specifically described.

A Spark Job is executed by invoking a Spark API from an application or driving a driver program through a Spark-summit tool or is executed through a command line interface (CLI) in a driver that is driven through a Spark-shell. Control through the CLI is chiefly used in an application development process. The driving of the Spark application is performed through the Spark API or Spark-summit. The pre-decision phase is a phase for deciding a cluster that will execute a Spark application depending on an input condition of a user before the driver program of the Spark cluster is executed, that is, at timing at which Spark-summit is invoked. The user may designate an importance numerical value of a feature for deciding the cluster as follows.

In this case, $P_t$ is a time feature point, $P_r$ is a resource feature point, and $P_o$ is an operation feature point.

The time feature point $P_t$ is a relative index that represents importance of time that is consumed to complete a Spark Job, and indicates that it is important to complete the Spark Job as soon as possible as a time feature value becomes greater. The resource feature point $P_r$ is a relative index that represents efficiency of a resource that is necessary to perform a Spark Job, and indicates that it is important to perform the Spark Job by using a less resource as a resource feature value becomes greater. The operation feature point $P_o$ is an index indicative of the flexibility of an execution environment for a Spark Job, and indicates that an independent execution environment, such as a container, is required as an operation feature value becomes greater.

For example, a user may relatively designate each index as follows.

$P_t=5$, $P_r=3$, $P_o=2$
$P_t=100$, $P_r=10$, $P_o=1$

An importance measure designated by a user may be used by being converted into a weight as follows.

$$w_t = \frac{P_t}{P_t + P_r + P_o} \quad \text{(time feature weight)}$$

$$w_r = \frac{P_r}{P_t + P_r + P_o} \quad \text{(resource feature weight)}$$

$$w_o = \frac{P_o}{P_t + P_r + P_o} \quad \text{(operation feature weight)},$$

$$w_t + w_r + w_o = 1.0$$

The time feature weight ($w_t$) is used through an operation with an idle resource amount of each cluster and an allocated resource consumption rate. Resource information of each cluster is obtained through a cluster manager (Kubernetes/YARN). The cluster resource is calculated by being limited to a CPU core and a memory. The cluster resource may be summed with the memory through CPU core*calibrationFactor. The calibrationFactor may increase its value in the case of "CPU-intensive" and decrease its value in the case of "memory-intensive" based on features of a Spark application. 10 is used as a basic value of the calibrationFactor. The idle resource amount is calculated based on currently available resources. The resource consumption rate is calculated as a ratio of a currently available amount compared to all of allocated resources. Importance of the time feature may be calculated by weighted-summing ($V_t$) the idle resource amount and the resource consumption rate and multiplying the results of the weighted sum by the time feature weight ($w_t$).

$$V_{t,K8s} = \frac{Core_{r,K8s} \times CF + Mem_{r,K8s}}{MAX(Core_{r,K8s} \times CF + Mem_{r,K8s}, Core_{r,BM} \times CF + Mem_{r,BM})} \times \alpha_t + \frac{Core_{r,K8s} \times CF + Mem_{r,K8s}}{Core_{a,K8s} \times CF + Mem_{a,K8s}} \times (1 - \alpha_t)$$

$$V_{t,BM} = \frac{Core_{r,BM} \times CF + Mem_{r,BM}}{MAX(Core_{r,K8s} \times CF + Mem_{r,K8s}, Core_{r,BM} \times CF + Mem_{r,BM})} \times \alpha_t + \frac{Core_{r,BM} \times CF + Mem_{r,BM}}{Core_{a,BM} \times CF + Mem_{a,BM}} \times (1 - \alpha_t)$$

$Core_r = Core_{remain}$, the number of available CPU cores that remain in the cluster $Core_a = Core_{assigned}$, the number of CPU cores allocated to the cluster $Mem_r = Memory_{remain}$, the amount of available memory that remains in the cluster $Mem_a = Memory_{assigned}$, the amount of memory allocated to the cluster CF=CalibrationFactor, a core conversion index, default=10

$\alpha_t$, an idle resource amount and a resource consumption rate weight

The followings illustrate a corresponding example.
K8s: 20/30 core, 300/500 GB
BareMetal: 10/20 core, 150/400 GB
K8s: 20*Calibration Factor+300=500→500/500=1.0
BM: 10*Calibration Factor+150=250→250/500=0.5
The Resource Consumption Rate
K8s: 500/800=0.625
BM: 250/600=0.417
A weighted sum (weight=0.7)
K8s: 1.0*0.7+0.625*0.3=0.887
BM: 0.5*0.7+0.417*0.3=0.475

The resource feature point $P_r$ may be used through an operation of the number of executors that is executed and resource overhead. A degree of parallel processing in Spark may be divided into parallel processing (executor) in a process level and parallel processing (task) in a thread level.

The bare-metal-based cluster basically uses one executor or a small number of executors per cluster node. In contrast, the Kubernetes-based cluster may allow up to 110 executions per node because an executor is executed for each job and the executor plays a role as one virtual machine. In a logical aspect, the Kubernetes-based cluster is advantageous for the parallel processing in the process level.

Tasks within one executor are processed in parallel through a contention between resources that are allocated to an executor because the tasks share the same JVM and are executed as a thread. The bare-metal-based cluster that executes one executor per node can perform a task by allocating many resources to the executor. Accordingly, the bare-metal-based cluster is advantageous for the parallel processing in the thread level. However, the executor of the Kubernetes-based cluster corresponds to resource sharing/parallel processing between task threads for the same Job. In contrast, the executor of the bare-metal-based cluster corresponds to resource sharing/parallel processing between task threads for different jobs.

When the same resource is allocated to the same job by assigning a weight to each of the parallel processing in the process level and the parallel processing in the thread level, importance of the resource feature may be calculated by calculating a degree of parallel processing ($V_r$) and multiplying the degree of parallel processing ($V_r$) by a resource feature weight ($w_r$).

$$V_{r,K8s} = \frac{\frac{Core_{r,K8s}}{Core_{exec,K8s} \times OF_r}}{MAX\left(\frac{Core_{r,K8s}}{Core_{exec,K8s} \times OF_r}, \frac{Core_{r,BM}}{Core_{exec,BM}}\right)} \times \alpha_r +$$

$$\frac{\frac{Core_{exec,K8s}}{Core_{task,K8s}}}{MAX\left(\frac{Core_{exec,K8s}}{Core_{task,K8s}}, \frac{Core_{exec,BM}}{Core_{task,BM}}\right)} \times (1 - \alpha_r)$$

$$V_{r,BM} = \frac{\frac{Core_{r,BM}}{Core_{exec,BM}}}{MAX\left(\frac{Core_{r,K8s}}{Core_{exec,K8s} \times OF_r}, \frac{Core_{r,BM}}{Core_{exec,BM}}\right)} \times \alpha_r +$$

$$\frac{\frac{Core_{exec,BM}}{Core_{task,BM}}}{MAX\left(\frac{Core_{exec,K8s}}{Core_{task,K8s}}, \frac{Core_{exec,BM}}{Core_{task,BM}}\right)} \times (1 - \alpha_r)$$

$Core_{exec} = Core_{executor}$, the number of CPU cores allocated to an executor $Core_{task}$, the number of CPU cores allocated to a task $OF_r$, resource overhead when a container is used, default=1.4

$\alpha_r$, a process/thread parallel processing weight

The followings illustrate a corresponding example.

K8s: 20/30 core, 300/500 GB

BareMetal: 10/20 core, 150/400 GB

The Degree of Parallel Processing in the Process Level

K8s: 20/0.5=40, 40/1.4=28.47, 28.57/28.57=1

BM: 10/0.1=10, 10/28.57=0.35

The Degree of Parallel Processing in the Thread Level

K8s: 0.5/0.1=5, 5/10=0.5

BM: 1.0/0.1=10, 10/10=1

(weight=0.3)

K8s: 1.0*0.3+0.5*0.7=0.65

BM: 0.35*0.3+1.0*0.7=0.805

The operation feature point $P_o$ may be used through an operation with a relative gain if a Spark application is executed based on a container in the Kubernetes-based cluster and if a Spark application is executed based on a container the bare-metal-based cluster.

In order to execute a Spark job based on a container, the Spark job needs to be previously imaged. In contrast, there is an advantage in that an independent execution environment can be provided for each container image.

In contrast, the bare-metal-based cluster has a disadvantage in that an environment constructed in each node needs to be shared and a disadvantage in that it is difficult to handle a change in the execution environment.

Importance of the operation feature may be calculated by weighted-summing overhead according to the preparation of container-based driving and a container-based driving gain (container gain) and multiplying the results of the weighted sum by the operation feature point $P_o$.

$$V_{o,K8s} = \frac{NumOfSparkApp \times OF_{K8s}}{MAX(NumOfSparkApp \times OF_{K8s}, NumOfSparkApp \times OF_{BM})} \times \alpha_o +$$

$$ContainerGain \times (1 - \alpha_o)$$

$$V_{o,BM} = \frac{NumOfSparkApp \times OF_{BM}}{MAX(NumOfSparkApp \times OF_{K8s}, NumOfSparkApp \times OF_{BM})} \times \alpha_o +$$

$$ContainerGain \times (1 - \alpha_o)$$

$OF_{K8s}$, overhead for Spark app container driving in K8s, default=0.1

$OF_{BM}$, overhead for Spark app driving in the bare-metal-based cluster, default=0.0

ContainerGain, $1-OF_{K8s}$ in the case of K8s, 0 in the case of BM $\alpha_o$, a container operation weight The followings illustrate a corresponding example.

Overhead (OverheadFactor$_{K8s}$=0.1, OverheadFactor$_{BM}$=0.0)

K8s: 20 (the number of execution applications)*0.1=2.0, 2.0/2.0=1.0

BM: 20 (the number of execution applications)*0.0=0.0, 0.0/2.0=0.0

Container Gain

K8s: 1.0−0.1=0.9

BM: 0.0

Weighted sum (weight=0.2)

K8s: 1.0*0.2+0.9*0.8=0.92

BM: 0.0*0.0+0.0*0.0=0.0

The final cluster decision is performed as follows.

$$E_{K8s} = V_{t,K8s} \times w_t + V_{r,K8s} \times w_r + V_{o,K8s} \times w_o$$

$$E_{BM} = V_{t,BM} \times w_t + V_{r,BM} \times w_r + V_{o,BM} \times w_o$$

In this case, E is an expected value upon execution in the Spark cluster

An expected value of each cluster is calculated, and an Spark application is submitted to a side that has a greater value.

K8s: 0.5*0.887+0.3*0.65+0.2*0.92=0.8225

BM: 0.5*0.475+0.805+0.0*0.0=0.479

According to such a given condition, the Spark application may be executed as the Kubernetes-based cluster or the bare-metal-based cluster. For example, the Spark application may be executed as the Kubernetes-based cluster based on the given condition.

Furthermore, the timing at which features of a Spark job are confirmed may consist of a decision through the analysis of the Spark Job (analysis-based) and a collected metric-based decision. A decision based on a work load is performed after a driver program is started. Accordingly, the switching of an execution cluster may occur based on a result of the decision.

According to an embodiment, a Spark application may be submitted by being branched into a bare-metal-based cluster and a Kubernetes-based cluster based on a given condition.

Figure 1:
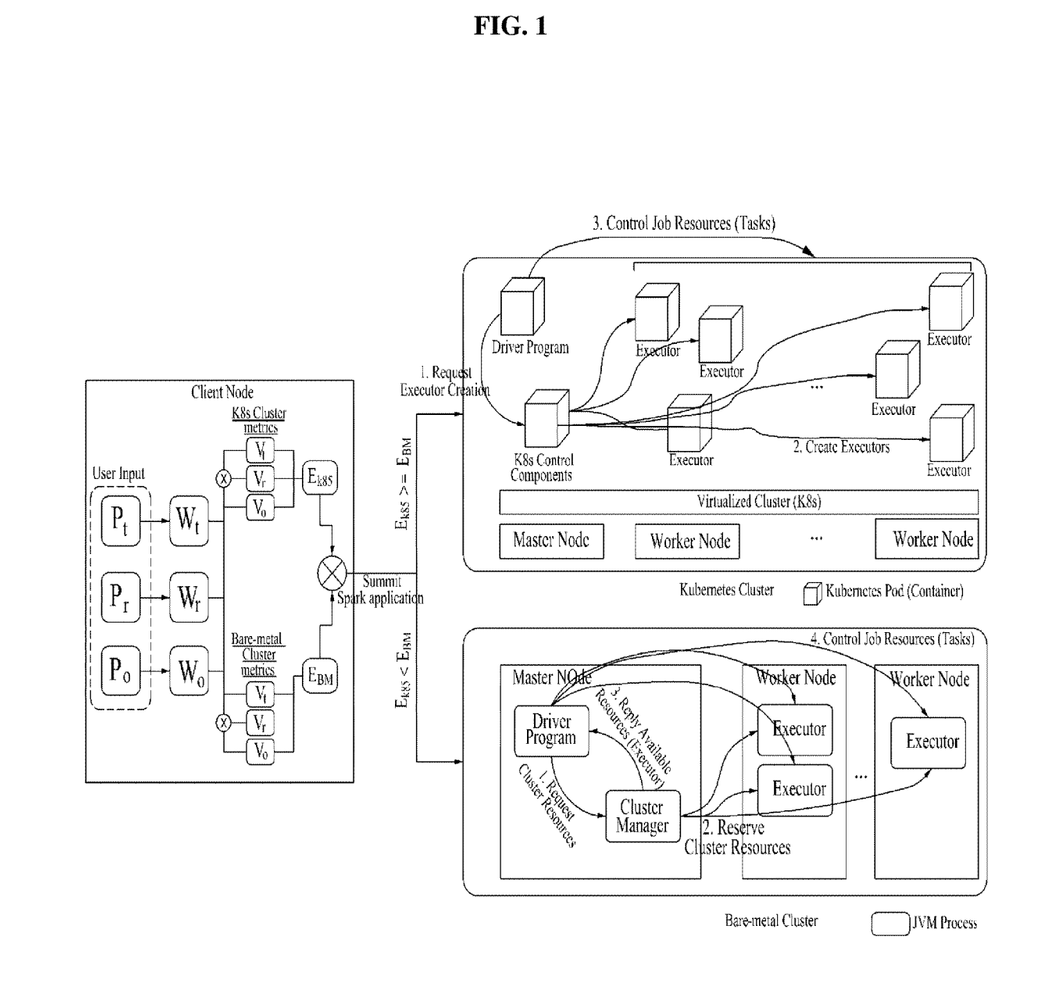
FIG. 1 is a diagram for describing a cluster management operation in an embodiment.
Figure 2:
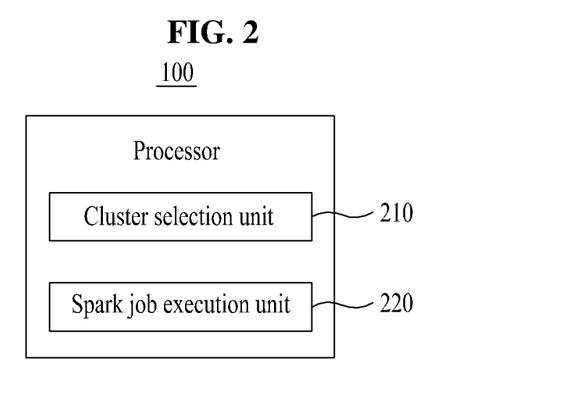
FIG. 2 is a block diagram for describing a construction of a cluster management system in an embodiment.
Figure 3:
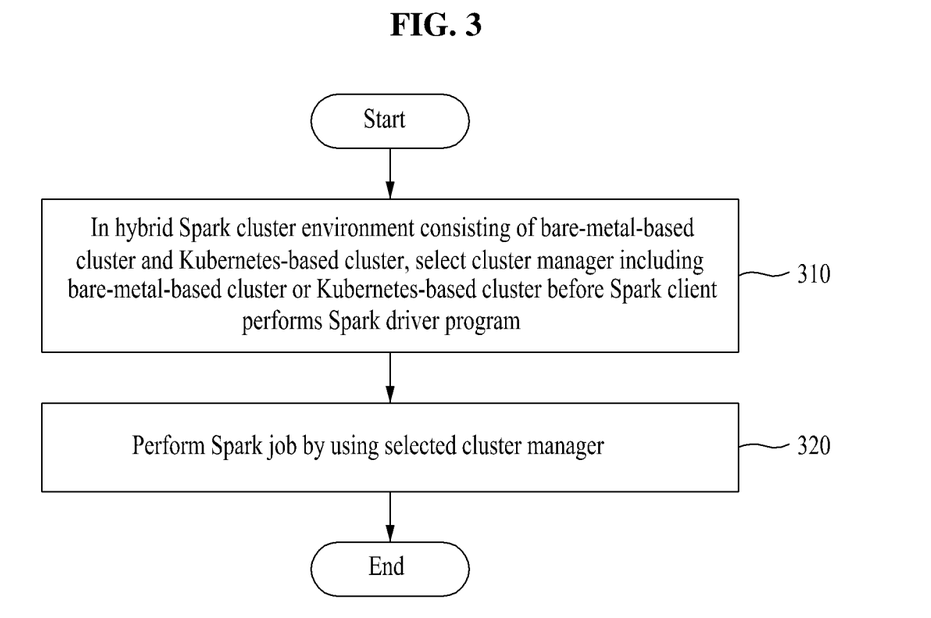
FIG. 3 is a flowchart for describing a cluster management method in an embodiment.

FIG. 2 is a block diagram for describing a construction of a cluster management system in an embodiment. FIG. 3 is a flowchart for describing a cluster management method in an embodiment.

A processor of a cluster management system 100 may include a cluster selection unit 210 and a Spark job execution unit 220. Such components of the processor may be expressions of different functions that are performed by the processor in response to a control instruction that is provided by a program code stored in the cluster management system. The processor and the components of the processor may control a human-fabricated system so that the human-fabricated system performs steps 310 to 320 that are included in the cluster management method of FIG. 3. In this case, the processor and the components of the processor may be implemented to execute an instruction according to a code of an operating system and a code of at least one program that is included in a memory.

The processor may load, onto the memory, a program code that is stored in a file of a program for the cluster management method. For example, when the program is executed in the cluster management system, the processor may control the cluster management system so that the program code is loaded from the file of the program to the memory under the control of an operating system. In this case, each of the cluster selection unit 210 and the Spark job execution unit 220 may be a different functional expression of the processor for subsequently executing steps 310 to 320 by executing an instruction of a corresponding portion of the program code loaded onto the memory.

In step 310, the cluster selection unit 210 may select a cluster manager including a bare-metal-based cluster or a Kubernetes-based cluster before a Spark client performs a Spark driver program in a hybrid Spark cluster environment consisting of the bare-metal-based cluster and the Kubernetes-based cluster. The cluster selection unit 210 may convert, into a time feature weight, a resource feature weight, and an operation feature weight, an importance measure as importance numerical values related to a time feature, a resource feature, and an operation feature are designated by a user. The cluster selection unit 210 may calculate importance of the time feature for the bare-metal-based cluster or the Kubernetes-based cluster by multiplying a value obtained by weighted-summing an idle resource amount and a resource consumption rate by the time feature weight. The cluster selection unit 210 may calculate importance of the resource feature for the bare-metal-based cluster or the Kubernetes-based cluster by multiplying a calculated value of a degree of parallel processing ($V_r$) by the resource feature weight when the same resource is allocated to the same job by assigning a weight to each of parallel processing in a process level and parallel processing in a thread level. The cluster selection unit 210 may calculate importance of the operation feature for the bare-metal-based cluster or the Kubernetes-based cluster by multiplying a value obtained by weighted-summing overhead according to the preparation of container-based driving and a container-based driving gain (container gain) by the operation feature weight.

In step 320, the Spark job execution unit 220 may perform the Spark job by using the selected cluster manager.

The aforementioned device may be implemented as a hardware component, a software component, or a combination of a hardware component and a software component. For example, the device and component described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. The processing device may perform an operating system (OS) and one or more software applications that are executed on the OS. Furthermore, the processing device may access, store, manipulate, process, and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, another processing configuration, such as a parallel processor, is also possible.

Software may include a computer program, a code, an instruction or a combination of one or more of them, and may configure a processing device so that the processing device operates as desired or may instruct the processing devices independently or collectively. The software and/or the data may be embodied in any type of machine, a component, a physical device, or a computer storage medium or device in order to be interpreted by the processing device or to provide an instruction or data to the processing device. The software may be distributed to computer systems that are connected over a network, and may be stored or executed in a distributed manner. The software and the data may be stored in one or more computer-readable recording media.

The method according to an embodiment may be implemented in the form of a program instruction executable by various computer means and recorded on a computer-readable recording medium. The computer-readable recording medium may include a program instruction, a data file, and a data structure alone or in combination. The program instruction recorded on the medium may be specially designed and constructed for an embodiment, or may be known and available to those skilled in the computer software field. Examples of the computer-readable recording medium include magnetic media such as a hard disk, a floppy disk and a magnetic tape, optical media such as a CD-ROM and a DVD, magneto-optical media such as a floptical disk, and hardware devices specially configured to store and execute a program instruction, such as a ROM, a RAM, and a flash memory. Examples of the program instruction include not only machine language code produced by a compiler, but a high-level language code which may be executed by a computer using an interpreter, etc.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The invention claimed is:

1. A cluster management method which is performed by a cluster management system, the cluster management method comprising:

in a hybrid Spark cluster environment comprising a bare-metal-based cluster and a Kubernetes-based cluster, selecting a cluster manager comprising the bare-metal-based cluster or the Kubernetes-based cluster before a Spark client performs a Spark driver program; and performing a Spark job by using the selected cluster manager, wherein selecting the cluster manager comprises:

converting, into a time feature weight, a resource feature weight, and an operation feature weight, an importance measure as importance numerical values related to a time feature, a resource feature, and an operation feature are designated by a user, calculating importance of the time feature for the bare-metal-based cluster or the Kubernetes-based cluster by multiplying a value obtained by weighted-summing an idle resource amount and a resource consumption rate by the time feature weight according to Equation 1 and Equation 2, $$V_{t,K8s} = \frac{Core_{r,K8s} \times CF + Mem_{r,K8s}}{MAX\ (Core_{r,K8s} \times CF + Mem_{r,K8s}, Core_{r,BM} \times CF + Mem_{r,BM})} \times \alpha_t + \frac{Core_{r,K8s} \times CF + Mem_{r,K8s}}{Core_{a,K8s} \times CF + Mem_{a,K8s}} \times (1 - \alpha_t) \qquad \text{Equation 1}$$

$$V_{t,BM} = \frac{Core_{r,BM} \times CF + Mem_{r,BM}}{MAX\ (Core_{r,K8s} \times CF + Mem_{r,K8s}, Core_{r,BM} \times CF + Mem_{r,BM})} \times \alpha_t + \frac{Core_{r,BM} \times CF + Mem_{r,BM}}{Core_{a,BM} \times CF + Mem_{a,BM}} \times (1 - \alpha_t) \qquad \text{Equation 2}$$

wherein $Core_r$ means the number of available CPU cores that remain in the cluster, $Mem_r$ means the amount of available memory that remains in the cluster, $Mem_a$ means the amount of memory allocated to the cluster, a calibration factor (CF) means a core conversion index, and $\alpha_t$ means an idle resource amount and a resource consumption rate weight, calculating importance of the resource feature for the bare-metal-based cluster or the Kubernetes-based cluster by multiplying a calculated value of a degree of parallel processing ($V_r$) by the resource feature weight when an identical resource is allocated to an identical job by assigning a weight to each of parallel processing in a process level and parallel processing in a thread level according to Equation 3 or Equation 4, $$V_{r,K8s} = \frac{\frac{Core_{r,K8s}}{Core_{exec,K8s} \times OF_r}}{MAX\left(\frac{Core_{r,K8s}}{Core_{exec,K8s} \times OF_r}, \frac{Core_{r,BM}}{Core_{exec,BM}}\right)} \times \alpha_r + \frac{\frac{Core_{exec,K8s}}{Core_{task,K8s}}}{MAX\left(\frac{Core_{exec,K8s}}{Core_{task,K8s}}, \frac{Core_{exec,BM}}{Core_{task,BM}}\right)} \times (1 - \alpha_r) \qquad \text{Equation 3}$$

$$V_{r,BM} = \frac{\frac{Core_{r,BM}}{Core_{exec,BM}}}{MAX\left(\frac{Core_{r,K8s}}{Core_{exec,K8s} \times OF_r}, \frac{Core_{r,BM}}{Core_{exec,BM}}\right)} \times \alpha_r + \frac{\frac{Core_{exec,BM}}{Core_{task,BM}}}{MAX\left(\frac{Core_{exec,K8s}}{Core_{task,K8s}}, \frac{Core_{exec,BM}}{Core_{task,BM}}\right)} \times (1 - \alpha_r) \qquad \text{Equation 4}$$

wherein $Core_{exec}$ means the number of CPU cores allocated to an executor, $Core_{task}$ means the number of CPU cores a allocated a task, $OF_r$ means resource overhead when a container is used, and $\alpha_r$ means a process/thread parallel processing weight, calculating importance of the operation feature for the bare-metal-based cluster or the Kubernetes-based cluster by multiplying a value obtained by weighted-summing overhead according to the preparation of container-based driving and a container-based driving gain (container gain) by the operation feature weight according to Equation 5 or Equation 6, $$V_{o,K8s} = \frac{NumOfSparkApp \times OF_{K8s}}{MAX\ (NumOfSparkApp \times OF_{K8s}, NumOfSparkApp \times OF_{BM})} \times \alpha_o + ContainerGain \times (1 - \alpha_o) \qquad \text{Equation 5}$$

$$V_{o,BM} = \frac{NumOfSparkApp \times OF_{BM}}{MAX\ (NumOfSparkApp \times OF_{K8s}, NumOfSparkApp \times OF_{BM})} \times \alpha_o + ContainerGain \times (1 - \alpha_o) \qquad \text{Equation 6}$$

wherein $OF_{K8s}$ means overhead for Spark application container driving in K8s, $OF_{BM}$ means overhead for Spark application driving in the bare-metal-based cluster, a container gain means $1-OF_{K8s}$ in case of K8s and 0 in case of BM, and $\alpha_o$ means a container operation weight.

2. The cluster management method of claim 1, wherein the Spark Job is executed by invoking a Spark API from an application or driving a driver program through a Spark-summit tool or is executed through a command line interface (CLI) in a driver that is driven through a Spark-shell.

3. The cluster management method of claim 1, wherein:

the time feature is an index that represents importance of time that is consumed to complete the Spark Job, and indicates that it is important to complete the Spark Job as soon as possible as a time feature value becomes greater, the resource feature is an index that represents efficiency of a resource that is necessary to perform the Spark Job, and indicates that it is important to perform the Spark Job by using a less resource as a resource feature value becomes greater, and the operation feature is an index indicative of a flexibility of an execution environment for the Spark Job, and indicates that an independent execution environment is required as an operation feature value becomes greater.

4. The cluster management method of claim 1, wherein:

the bare-metal-based cluster basically uses one executor or a small number of executors per cluster node, and the executor of the bare-metal-based cluster performs resource sharing/parallel processing between task threads of different jobs, and in the Kubernetes-based cluster, an executor is executed for each job, the executor itself of the Kubernetes-based cluster plays a role as one virtual machine, and the executor of the Kubernetes-based cluster performs resource sharing/parallel processing between task threads of an identical job.

* * * * *

UNITED STATES PATENT AND TRADEMARK OFFICE
CERTIFICATE OF CORRECTION

PATENT NO. : 12,346,737 B2
APPLICATION NO. : 17/929413
DATED : July 1, 2025
INVENTOR(S) : Dong-Wook Lee et al.

Page 1 of 1

It is certified that error appears in the above-identified patent and that said Letters Patent is hereby corrected as shown below:

In the Claims

In Column 11, Claim 1, Line 46, delete "(Vt)" and insert -- (Vr) --, therefor.

Signed and Sealed this
Twenty-third Day of September, 2025

John A. Squires
*Director of the United States Patent and Trademark Office*